(12) United States Patent
Cialone et al.

(10) Patent No.: US 9,181,420 B2
(45) Date of Patent: Nov. 10, 2015

(54) THERMOSET COMPOSITE MATERIAL AND STRUCTURAL COMPONENT AND METHOD OF MAKING THE SAME FROM ENGINEERED RECYCLED RUBBER POWDER

(71) Applicant: Encell Composites, LLC, Naples, FL (US)

(72) Inventors: Anthony M. Cialone, Naples, FL (US); Michael Grubb, Westerville, OH (US)

(73) Assignee: ENCELL COMPOSITES, LLC, Naples, FL (US)

( * ) Notice: Subject to any disclaimer, the term of this patent is extended or adjusted under 35 U.S.C. 154(b) by 0 days.

(21) Appl. No.: 14/191,808

(22) Filed: Feb. 27, 2014

(65) Prior Publication Data

US 2014/0175185 A1 Jun. 26, 2014

Related U.S. Application Data

(63) Continuation-in-part of application No. 13/151,637, filed on Jun. 2, 2011, now Pat. No. 8,680,165.

(60) Provisional application No. 61/351,369, filed on Jun. 4, 2010.

(51) Int. Cl.
*C08L 21/00* (2006.01)
*C08L 9/06* (2006.01)
*E01B 3/44* (2006.01)
(Continued)

(52) U.S. Cl.
CPC ............. *C08L 21/00* (2013.01); *B29C 43/003* (2013.01); *B29C 70/025* (2013.01); *C08G 18/10* (2013.01); *C08J 3/203* (2013.01); *C08J 5/00* (2013.01); *C08L 9/06* (2013.01); *E01B 3/44* (2013.01);
(Continued)

(58) Field of Classification Search
CPC ............. E01B 3/44; E01B 3/46; C08G 18/10; C08J 5/00; C08J 3/203; C08J 2475/02; C08J 2321/00; B29C 70/025; B29C 43/003; C08L 21/00; C08K 3/36
See application file for complete search history.

(56) References Cited

U.S. PATENT DOCUMENTS

| 4,101,463 A | 7/1978 | Morgan et al. |
| 4,244,841 A | 1/1981 | Frankland |

(Continued)

FOREIGN PATENT DOCUMENTS

| WO | 93/06991 | 4/1993 |
| WO | 2010/039327 | 4/2010 |

*Primary Examiner* — Frances Tischler
(74) *Attorney, Agent, or Firm* — Robert L. Wolter, Esq.; Beusse Wolter Sanks & Maire, PLLC

(57) ABSTRACT

A thermoset composite material and composite railroad crosstie fabricated from the thermoset composite material that comprises a substantially homogeneous blend of an amount of vulcanized rubber particles, polyurea binding agent and urea melamine. The thermoset composite material may also contain a granulated silica material. The thermoset composite material may comprise about 30% to about 50% by weight of the vulcanized rubber particles, and it is subjected to compression molding at a predetermined temperature and pressure for a resident time period forming the composite railroad crosstie. The thermoset composite material and railroad crosstie may further comprise a fibrous glass material in the form of unbundled fibers and/or one more glass mats encapsulated within the thermoset composite material. In addition or alternatively, an elongated core insert may be encapsulated in the thermoset composite material.

12 Claims, 6 Drawing Sheets

(51) Int. Cl.
- *C08G 18/10* (2006.01)
- *E01B 3/46* (2006.01)
- *B29C 43/00* (2006.01)
- *B29C 70/02* (2006.01)
- *C08J 3/20* (2006.01)
- *C08J 5/00* (2006.01)
- *C08K 3/36* (2006.01)

(52) U.S. Cl.
CPC ............... *E01B 3/46* (2013.01); *C08J 2321/00* (2013.01); *C08J 2475/02* (2013.01); *C08K 3/36* (2013.01)

(56) References Cited

U.S. PATENT DOCUMENTS

| | | | |
|---|---|---|---|
| 4,481,335 A | 11/1984 | Stark, Jr. | |
| 4,970,043 A | 11/1990 | Doan et al. | |
| 5,037,628 A | 8/1991 | Fader | |
| 5,094,905 A | 3/1992 | Murray | |
| 5,238,734 A | 8/1993 | Murray | |
| 5,488,080 A | 1/1996 | Osborn | |
| 5,506,274 A | 4/1996 | Brown | |
| 5,510,419 A | 4/1996 | Burgoyne et al. | |
| 5,588,600 A | 12/1996 | Perfido et al. | |
| 5,591,794 A | 1/1997 | Fukumoto et al. | |
| 5,604,277 A | 2/1997 | Osborn | |
| 5,844,043 A | 12/1998 | Peter et al. | |
| 5,861,117 A | 1/1999 | Rosenbaum | |
| 5,883,139 A | 3/1999 | Wideman et al. | |
| 5,889,119 A | 3/1999 | Coran et al. | |
| 6,194,519 B1 | 2/2001 | Blalock et al. | |
| 6,207,723 B1 | 3/2001 | Matsushita et al. | |
| 6,247,651 B1 | 6/2001 | Marinelli | |
| 6,262,175 B1 | 7/2001 | Jury et al. | |
| 6,265,454 B1 | 7/2001 | McNutt et al. | |
| 6,344,160 B1 | 2/2002 | Holtzberg | |
| 6,387,966 B1 | 5/2002 | Goldshtein et al. | |
| 6,797,757 B2 | 9/2004 | Wideman et al. | |
| 6,821,623 B2 | 11/2004 | Kvesic | |
| 6,828,372 B2 | 12/2004 | Sullivan et al. | |
| 6,896,964 B2 | 5/2005 | Kvesic | |
| 6,959,877 B2 | 11/2005 | Diamond | |
| 7,093,781 B2 | 8/2006 | Meckert et al. | |
| 7,108,207 B2 | 9/2006 | Waznys et al. | |
| 7,118,469 B1 * | 10/2006 | Lee | 451/527 |
| 2002/0123553 A1 * | 9/2002 | Sullivan et al. | 524/449 |
| 2004/0232253 A1 | 11/2004 | Hansen | |
| 2005/0065267 A1 | 3/2005 | Sullivan et al. | |
| 2006/0008612 A1 | 1/2006 | Brazier et al. | |
| 2006/0024453 A1 | 2/2006 | Setser et al. | |
| 2006/0172118 A1 * | 8/2006 | Han et al. | 428/156 |
| 2007/0231532 A1 | 10/2007 | Walters et al. | |
| 2011/0028257 A1 | 2/2011 | Sealey et al. | |

* cited by examiner

THERMOSET COMPOSITE MATERIAL AND STRUCTURAL COMPONENT AND METHOD OF MAKING THE SAME FROM ENGINEERED RECYCLED RUBBER POWDER

CROSS-REFERENCE TO RELATED APPLICATIONS

This application is a continuation-in-part of U.S. application Ser. No. 13/151,637, filed Jun. 2, 2011, which claims the benefit of U.S. Provisional Application No. 61/351,369 filed Jun. 4, 2010, and incorporated herein by reference in its entirety.

FIELD OF THE INVENTION

The present invention relates to composite materials used in the fabrication of structural components, and the methods of making such composite materials. More specifically, embodiments of the invention pertain to thermoset composite materials made from engineered recycled rubber powder.

Various processes and methods have been developed for comminuting discarded rubber articles, such as tires, wherein the discarded rubber articles are reduced to sizes that can be reused in production of new rubber products. The particulate form of this rubber product is often referred to as crumb rubber or rubber powder. Rubber comminuting processes and apparatus must overcome the high degree of elasticity of rubber. Indeed, the grinding or sheering of rubber products at ambient temperatures generates sufficient heat whereby the resultant rubber particles are relatively non-reactive. Moreover, such processes produce a crumb rubber that includes larger and non-uniform particulate sizes. While the crumb rubber produced by these processes was inexpensive and economical to use to fabricate new rubber products, the crumb rubber could not be used to develop a "rubber-based" product. That is, the crumb rubber is essentially used as filler materials, because the rubber polymer could not be cross-linked with other polymers.

Indeed, crumb rubber has been used as a secondary ingredient in technical compounds and products, and has not been used as the primary base polymer to which the composite is formulated and other additives and constituents are added. Typical commercial loadings for technical materials have been in the range of 1% to 15%. In such instances crumb rubber is used as a non-technical filler to reduce overall compound costs, and may detract from the technical properties of the base polymers. For example, adding more crumb rubber would effectively reduce tensile strength of a composite material.

Due to its inability to bond chemically, some prior art composites have been formulated employing plastics as the base polymer and utilized extrusion molding technologies in order to encapsulate the crumb rubber. In addition, thermoplastic elastomers (TPE's) used in the past had poor chemical and heat resistance and low thermal stability. Such TPE's often soften or melt at elevated temperatures derogating the polymer chain, making the composite material unusable.

Other process for comminuting rubber articles have been developed whereby certain steps of the process are thermally-controlled. That is, the temperature of the rubber particles is controlled or maintained at sufficiently low temperatures so that the temperature of the rubber during processing does not rise above its glass transition temperature causing the inherent elastic properties to emerge. Such processes are able to produce crumb rubber powder with much smaller particle sizes and more uniform distribution of a particle size. In addition, the crumb rubber particles may potentially be more reactive and capable of chemical bonding with other polymers. However, to date processes, methods or apparatuses have not been developed to take advantage of this technology to produce composite materials that are molded or configured to be used as functional structural components.

Providing a composite material that includes as its base material engineered recycled rubber particles that are used to fabricate structural components such as railroad crossties may be particularly advantageous. As developing countries build out their transportation infrastructure in harsh climates (extreme heat/cold, moisture, UV/sunlight, insects, etc.), longer lasting technical materials need to be used in order to amortize upfront costs over longer periods for financing and to reduce the cost of maintenance. Such use of composite materials can overcome difficulties of servicing tracks in remote locations, and reduce waste disposal.

BRIEF DESCRIPTION OF THE INVENTION

An embodiment of the invention includes a thermoset composite material or composite structural member that incorporates engineered recycled rubber particles (ERRP) as a base polymer and a primary component to which supplementary ingredients are added too, to enhance and improve desired mechanical and physical properties. Typical loadings may include as much as about 30% to about 90% by weight of ERRP, and/or about 30% to about 60% by weight of ERRP, and preferably about 30% to about 50% by weight of ERRP blended with a thermoset elastomeric binding agent. In embodiments, the elastomeric binding agent is polyurea. This blend is subjected to compressive molding forces at predetermined pressures and temperatures and resident times to form a thermoset composite material that can be used as a structural component such as a railroad crosstie.

Embodiments of the thermoset composite material or composite structural component may further comprise a granulated silica material and/or urea melamine at relative determined concentrations. The urea melamine may be a recycled powdered urea melamine. In addition, an unbundled glass fiber material may be mixed with the ERRP and the binding agent. Alternative to, or in addition to the glass fiber material, one or more glass fiber mats may be embedded within the thermoset composite material before a compressive force and heat is applied to the thermoset composite material to form a structural component such as a railroad crosstie. Embodiments of a structural component such as a composite railroad crosstie, which may or may not include one or both of the glass fiber material and/or the glass mat material, may further comprise a core insert that may be a reclaimed wooden railroad crosstie, a virgin wooden core insert, or a synthetic composite core insert embedded with the thermoset composite material.

Because the composite material employs ERRP as the technical based polymer, the ERRP represents the largest constituent per pound of the finished composite. As certain additives are incorporated and compounded in specific ways and at predetermined times in the process, the properties of the composite are enhanced. Embodiments of the thermoset composite material will not only allow railroad crossties to meet industry specifications, but also allow installation using the same equipment and fastening devices currently in use to install conventional crossties. The thermoset composite material may be manufactured to qualify as a carbon offset when compared to other railroad crosstie materials such as wood, concrete, plastic and other composites.

More specifically, embodiments that incorporate recycled constituents such as the ERRP, reclaimed railroad inserts and/or recycled urea melamine, reduce the carbon foot print of the railroad track system including the composite railroad crossties. For example, reclaiming and recycling railroad crossties removes crossties that have been treated with creosote that may leach into the ground, which may be hazardous to the environment. In addition, by using ERRP the inventory of used rubber may be reduced and/or at least not increased.

DETAILED DESCRIPTION OF THE INVENTION

Figure 1:
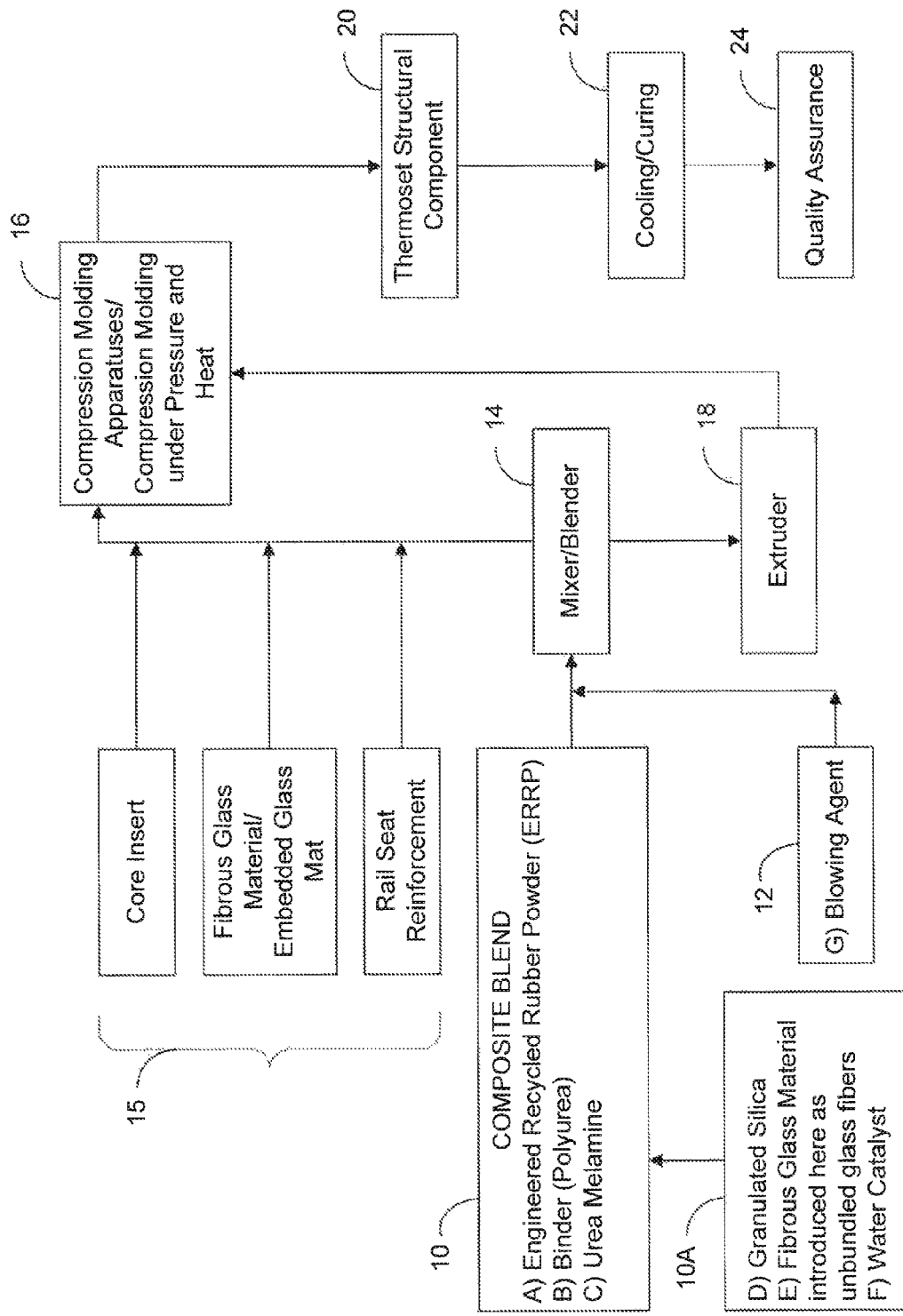
FIG. 1 is a flow diagram describing the process for making the thermoset composite material and/or composite structural component.

An embodiment of the invention for a thermoset composite material, and/or a composite structural component as a railroad crosstie, may be fabricated from a blend of recycled vulcanized crumb rubber powder, also referred to as engineered recycled rubber powder ("ERRP") and a thermoset elastomeric binding agent. This blend is mixed to form a homogeneous mixture of the components and then may be molded under sufficient heat and pressure for a resident time to form a composite material and/or composite structural component. In one embodiment, the blend may include the ERRP combined with a thermoset polyurea resin, which is subjected to heat and pressure to provide a thermoset composite material.

In preferred embodiments, the blend mixture further comprises a granulated silica material, urea melamine and/or a fibrous glass material, which may take the form unbundled glass fibers and/or a glass mat. In other embodiments, the composite railroad crosstie may include an elongated core insert encapsulated within the thermoset composite material.

In any of the disclosed embodiments, the molded composite material has the desired properties such as density, tensile strength, hardness and bending stiffness to serve as a structural component such as a railroad crosstie.

The ERRP or vulcanized rubber particles may be produced from known processes such as methods disclosed in U.S. Pat. Nos. 5,588,600; 7,093,781; and, 7,108,207 for comminuting particle rubber, which are incorporated herein by reference. Such methods include steps for cooling or freezing rubber particles at cryogenic temperatures, before comminuting the rubber. Such crumb rubber powder includes the above-referenced ERRP and may also be referred to as cryogenically granulated rubber powder. This crumb rubber powder exhibits a unique surface suitable to interfacial adhesion and excellent mechanical properties when processed in forming a composite material. Indeed, the use of this ERRP may reduce the need for expensive modifiers.

The invention is also contemplated to cover any ERRP or vulcanized recycled rubber particles that are fabricated under thermally controlled conditions, such as controlling the temperature of the rubber material during grinding steps or other steps in a comminuting process. Thus, the term "thermally-controlled granulated rubber" as used herein shall mean any vulcanized crumb rubber or rubber product in particulate form that is fabricated under thermally controlled conditions such that temperature of the rubber is maintained below a predetermined temperature that may have a deleterious effect on the physical or mechanical characteristics of the rubber.

In addition to the foregoing components, a blowing agent may be added to the mixture to control some end-product characteristics such as elasticity, hardness, tensile strength, compression, weight, etc. Known blowing agents that may be used with the above-described rubber materials may be selected from a group of blowing agents known as sulphohydrazides, which may decompose at lower temperatures relative to some other blowing agents. The sulphohydrazides may have a decomposition temperature of about 105° C. or higher, compared to azodicarbonamides which may have decomposition temperatures ranging from about 165° C. to about 210° C. As described in more detail, the blowing agents may be introduced into the homogeneous mixture before the compression molding stage of the described process/method begins.

The particle size of the vulcanized rubber powder may vary according to the desired mechanical or physical properties of thermoset composite material fabricated using the blend. When referring to a particle size the term "mesh" may be used to refer to a sample of rubber particles having generally a single size or diameter, or a range of sizes. For example, a sample or an amount of rubber particles in which the particles have a 10 mesh size shall mean that a percentage (typically 95%) of the particles for the given sample has a diameter of 2 mm or less, or 95% of the particles will pass through a 10 mesh sieve. When referring to a sample, or given amount of rubber particles, having a range of mesh sizes it is meant that a certain percentage (typically 95%) of the rubber particles for that sample are within the designated range. For example, a sample having rubber particles in the range of −40 mesh to +60 mesh shall refer to particle sizes wherein about 95% of the particles will pass through a 40 mesh sieve, but also be retained by a 60 mesh sieve. In this example, the particles of the given sample would have a diameter from about 0.25 mm (250 µm) to about 0.4 mm (400 µm).

The thermally-controlled granulated vulcanized rubber particles or ERRP, as compared to other crumb rubber products, have more chemically active sites making it more reactive, thereby, providing a level of chemical reactivity between the rubber particles and other polymers possible. Accordingly, the size of the particles and distribution of a particle size within a sample of the ERRP may directly affect the reactivity capabilities of the ERRP with other polymers, such as the above-described thermoset elastomeric bonding agents.

It follows, that the particle size and particle size distribution of the vulcanized recycle rubber particles may have a direct effect on physical properties of the blend before the blend is cured, which effects the processing of the blend and/or curing process. For example, smaller particle size and particle size distribution may increase the viscosity of the blend, which may increase an incorporation time during mixing to create the homogenous blend. In addition, a larger particle size distribution may result in the blend, in an extruded or molded form, to shrink or swell more than smaller particles, which may directly affect the amount of the blend used to mold and form structural component according to certain dimensions and configurations. In addition, the particle size and size distribution directly affects the density of the final composite material, which in turn affects other mechanical and physical properties of the thermoset composite material. For example, tensile strength of the composite material increases as the number of smaller particles increase; an increase in hardness is consistent with smaller particles sizes and distributions; or, the percentage of elongation at break also increases with smaller particle sizes.

With respect to embodiments of the invention, the particle size for the vulcanized rubber particles for a given blend may range anywhere from about 10 mesh to about 140 mesh. That is the size for all of the vulcanized rubber particles for a selected amount of ERRP may be a single size selected from the size range from 10 mesh (larger) through 140 mesh (smaller). Alternatively, the size of all of the particles for a selected amount of ERRP may vary in size such that there are particles that are no larger than 10 mesh and no smaller than 140 mesh. Preferably, the particle size is in the range of about 10 mesh to about 60 mesh, and more preferably from about 20 mesh to about 40 mesh.

In an embodiment, a selected amount of ERRP used in the blend may have a predetermined ratio of different sizes of the vulcanized rubber particles. This ratio of different particle sizes may be selected according to one or more desired physical or mechanical properties of the thermoset composite material, which properties may be dependent on the function of the structural component fabricated from the thermoset composite material. By way of example, a railroad crosstie which requires a high degree of stiffness with good tensile strength properties may be fabricated from a blend of the ERRP and the thermoset elastomeric binding agent and have a density ranging from 45 lb/ft³ to about 80 lb/ft³, and preferably a density ranging from 60 lb/ft³ to about 70 lb/ft³. A blend including the ERRP for such a structural component may include a ratio of particles sizes of the ERRP as follows:
  about 25% of the particles have a −20 mesh size (25% have an average diameter of 707 microns or smaller);
  about 25% of the particles have a −40 mesh to +60 mesh size (25% have a diameter of 250 microns-400 microns); and,
  about 50% of the particles having a −80 mesh size (25% having an average diameter of 177 microns or smaller).
Such a blend of ERRP and the binding agent may produce a thermoset composite material having a density that is at least 60 lbs/ft³.

In another example, the ratio of different sizes of particles may include a higher content of larger particles to affect a physical characteristic of the composite material. For example, an increase of larger particle size distribution may allow for additional vibration damping, and the thermoset composite material may of have a density of about 45-50 lbs/ft³. Such a blend may include ERRP with a ratio of particle sizes including:
  about 33% of the particles having a −20 mesh size (33% have an average diameter of 707 microns or smaller);
  about 33% of the particles of −40 mesh to +60 mesh size (33% have a diameter of 250 microns-400 microns); and,
  about 33% of the particles have −80 mesh (33% having an average diameter of 177 microns or smaller).

In yet another example, a desired amount of elasticity may necessary for a vertical structural component such as a marine piling, wherein the thermoset composite material may have a density of about 40-50 lbs/ft³. Such a blend may include ERRP with a ratio of particle sizes including:
  about 40% of the particles having a −20 mesh size (40% have an average diameter of 707 microns or smaller);
  about 30% of the particles of −40 mesh to +60 mesh size (30% have a diameter of 250 microns-400 microns); and,
  about 30% of the particles have −80 mesh (33% having an average diameter of 177 microns or smaller).

With respect to FIG. 1, there is shown a flow diagram that outlines a method for making a thermoset composite material; or, the same may be characterized as a method of fabricating a composite structural component from a thermoset composite material. In a first step 10, and as will be described in more detail below, each of the components including the ERRP (A), the polyurea binder (B), and the urea melamine (C) are added to a mixer for blending. In addition, at step 10A a granulated silica material (D) and/or fibrous glass material (E) may also be added to this blend of constituents. The fibrous glass material may be unbundled glass fibers, in which case this material is added to the blend before a mixing step 14. If the fibrous glass material alternatively or additionally includes encapsulating a glass mat (Step 15) in the thermoset composite material, the glass mat(s) may be added after mixing/blending and during the placement of the blend into a mold and before step 16 at which time compression and heat are applied to the blend. The term "encapsulated" as used herein to describe embodiments is intended to encompass instances or examples when all surfaces of the glass mat are covered by the composite material and/or instances when portions or surfaces of the glass mat are exposed and not covered by the composite material.

As known to those skilled in the art, high shear mixers may have counter-rotating rotors that may generate considerable heat during the mixing process; therefore, measures may be taken to maintain the temperature of the mixture, or an interior of the high shear mixture, below temperatures at which full reaction may occur. Typical temperatures for high shear mixing may be controlled from 100° F. to 175° F.

In an alternative step 12, other additives such as fillers, blowing agents, compatibilizers, etc., may be introduced at this stage. Some examples of fillers may include recycled fibrous materials such as recycled currency or carpet, calcium carbonate, MISTRON® monomix talc or MISTRON® vapor talc.

Again in reference to step 12 regarding introduction of a blowing agent into the blend, the blowing agent may be added in an amount of about 0.00% to 0.5%, and preferably 0.025% to about 0.5% of the blend/composite material when added. Blowing agents are known as substances that may be mixed into a variety of materials, including composite materials that undergo a controlled degradation, which liberates inert gas under the temperatures and pressures of compression molding to generate cellular structures within the composite matrix. The stage at which the blowing agent is introduced into the homogeneous mixture may depend on the type of blowing agent used. For example, a blowing agent that decomposes at lower temperatures, such as sulphohydrazines, may be introduced to the homogeneous mixture prior to injection into the compression molding stage at step 16. To that end, blowing agents, such as azodicarbonamides that decompose at higher temperatures may be introduced earlier into the homogeneous mixture at the mixing stages 10 and 14. Introduction of the blowing agent into the high shear mixer may also be dictated by the mixing temperature. A sufficient amount of blowing agent should be introduced in order to achieve the desired physical properties of the end product.

At step 14, the above-described blend is mixed in the high shear mixer to achieve a substantially or generally homogeneous mix of the ERRP, polyurea binding agent, urea melamine and/or granulated silica and other constituents. As indicated above the blend may also include the unbundled fibrous glass material. The term homogeneous as used herein generally means that the mixture has the same proportions throughout a given sample or multiple samples of different proportion to create a consistent mixture. With respect to the weights of the compositions or blends set forth in the below described compositions in Tables I-V, the mixing step 14 may take 5-10 minutes, or possibly shorter or longer depending on the volume or weight of the blend. In addition, mixing may include one or mixing steps before or after particular constituents are added.

With respect to step 16, the homogeneous mixture is introduced into one or more molds of a compression molding apparatus wherein the mixture undergoes compressed molding at a predetermined temperature, a predetermined pressure and for a resident time period. Depending on the type of structural component being manufactured a plurality of molds may be provided that are dimensioned to form the desired structural components. For example, molds dimensioned to form railroad crossties may be provided wherein the railroad crosstie manufactured may be 7"×9"×102" (or 108"). In such a case, the homogeneous mixture may be subjected from about 300 psi to about 1,500 psi for a resident time of about 15 minutes to about 60 minutes at a temperature ranging from about 230° F. to about 330° F. These cited parameters are provided by way of example, and one skilled in the art will appreciate that these parameters may vary according to the dimensions of the structural component, according to the other physical characteristics such as elasticity, stiffness, hardness, compression strength, etc. and/or according to the concentrations levels of the different constituents.

Step 15 is an optional step for the formation of different embodiments of composite railroad crossties. As shown different reinforcement components may be added to the mold including a core insert and/or rail seat reinforcements. The fibrous glass material may be introduced at this stage in form of glass mats, which may be in addition, or as an alternative, to the unbundled glass fibers. These reinforcement components are encapsulated in the thermoset composite material during step 16 of compression to enhance physical properties of a structural component to be formed.

An additional step 18 is also referenced in FIG. 1, wherein the homogeneous mixture undergoes extrusion during the delivery of the homogeneous mixture from the high shear mixer to the compression molding process. An extruder may deliver the mixture under pressure and temperature in order to maintain the mixture at a desired viscosity for delivery to the compression molding process. In addition, the extrusion may also maintain the homogeneous characteristic of the mixture; and, the amount or quantity extruded must correspond to the physical dimensions of the structural component to be fabricated. The extrusion may take place at temperatures of about 325° F. to about 400° F. at pressures ranging from pout 750 psi to about 1500 psi.

At steps 20 and 22, a structural component developed from the above-described method and blend is removed from the mold and allowed to cool. The component may be cooled to ambient room temperature. Finally, at step 24 quality assurance tests may be conducted on one or more sample structural components to determine if the component meets some predetermined criteria or physical property profile to function for an intended purpose.

Testing Composite Material of ERRP, Polyurea and Urea Melamine

Samples of a composite material containing ERRP, polyurea and urea melamine were formulated, molded and tested. More specifically, test samples containing from about 70 pph to about 100 pph of 20 mesh ERRP, about 10 pph to about 20 pph polyurea (Suprasec 9577 manufactured by Huntsman) and about 15 pph to about 30 pph of recycled powdered urea melamine. In addition, water was added as a catalysts in amounts of about 1 to about 2 pph. As indicated in the below Table I some samples did not include the powdered urea melamine.

Testing was performed on 3"×5"×2" composite blocks were prepared weighing The ERRP out into a KitchenAid mixer and the Suprasec 9577 (polyurea) was added and mixed by hand with a spatula. To the extent urea melamine was added as a constituent it was added after the polyurea, Suprasec 9577. The mixture was mixed for 5 minutes at a mixer setting of 5. Water was added slowly while mixing. Then mixing continued for 2 additional minutes. A mold fabricated with ½" steel plates with a removable bottom was preheated to about 275° F. The composite mixture was spread evenly in the mold and a 3"×5" follower plate was placed over the composite mixture. The mold and composite mixture were then placed under a compressive force for 10 minutes.

Using known and established testing methods, the molded samples were then tested for certain properties such as tear strength (ASTM D624), tensile strength and % elongation (ASTM 412), flexural strength and flexural modulus (ASTM 790) and hardness (ASTM 240). The test results are set forth in Table I below:

TABLE I

|  | 17A | 17B | 17C | 17D | 17E | 17F | 17G |
|---|---|---|---|---|---|---|---|
| Mesh | 20 | 20 | 20 | 20 | 20 | 20 | 20 |
| Tear Strength Die C, pli | 65 ± 1 | 74 ± 4 | 75 ± 4 | 72 ± 1 | 102 ± 7 | 107 ± 1 | 132 ± 5 |
| Tensile, psi | 406 ± 10 | 418 ± 4 | 340 ± 17 | 413 ± 4 | 572 ± 21 | 638 ± 7 | 747 ± 16 |
| Elongation, % | 48 ± 5 | 26 ± 1 | 7 ± 2 | 33 ± 1 | 36 ± 4 | 23 ± 1 | 7 ± 1 |

TABLE I-continued

|  | 17A | 17B | 17C | 17D | 17E | 17F | 17G |
|---|---|---|---|---|---|---|---|
| Flexural Strength, psi | 441 ± 6 | 590 ± 5 | 656 ± 32 | 516 ± 11 | 604 ± n/a | 836 ± 14 | 1022 ± 60 |
| Flexural Modulus, psi | 2570 ± 211 | 5153 ± 7 | 11302 ± 733 | 3416 ± 125 | 4732 ± 196 | 8464 ± 146 | 12669 ± 1418 |
| Density, pcf | 70 | 70 | 70 | 70 | 70 | 70 | 70 |
| Hardness Shore A | 80-82 | 85-89 | 87-95 | 83-85 | 85-87 | 90-95 | 90-95 |
| Suprasec 9577 | 10 | 10 | 10 | 15 | 20 | 20 | 20 |
| Water | 1 | 1 | 1 | 1.5 | 2 | 2 | 2 |
| 20 Mesh Rubber | 100 | 85 | 70 | 100 | 100 | 85 | 70 |
| Urea-melamine | — | 15 | 30 | — | — | 15 | 30 |
| Pressure used & | 2.5 ton | 2.0 ton | 2.0 ton | 2.0 ton | 2.5 ton | 2.0 ton | 2.0 ton |
| Resulting psi | 333 psi | 267 psi | 267 psi | 267 psi | 333 psi | 267 psi | 267 psi |

The above test results indicate a thermoset composite material containing ERRP with polyurea as a binding agent and recycled urea melamine powder as a filler with compression molding taking place at about 260 psi to about 270 psi at about 275° F. for a resident time of about 10 minutes, will produce structural components that will meet the mechanical properties required for various structural components, including but not limited to railroad crossties. Indeed, the samples containing urea melamine demonstrated enhanced properties relative to samples not containing the filler. As shown, test results for flexural strength and flexural modulus for the samples containing urea melamine were higher than those samples not containing the filler.

Embodiments of the invention for a thermoset composite material and/or a composite structural component such as a railroad crosstie may comprise vulcanized recycled rubber particles (ERRP), a polyurea binding agent, urea melamine and/or a granulated silica material. The granulated silica may be an alumino-silicate glass ceramic (Spherix) manufactured and sold by the SEFA Group located in Lexington, S.C., and it is understood by the inventors that such a product to date has not been used in a rubber or thermoset product. The urea melamine is preferably a recycled urea melamine powder filler. An example of such a filler is produced and sold under the brand name Polyfill by U.S. Technology located in Canton, Ohio. An embodiment of the invention may include these constituents at concentrations or concentrations according to the formulation set forth below in Tables II and III.

TABLE II

| Thermoset Composite Constituent | Concentrations (% by weight) |
|---|---|
| Engineered Recycled Rubber Particles (EERP) | About 30% to about 50% |
| Polyurea Resin | About 12% to about 20% |
| Granulated Silica | About 5% to about 15% |
| Urea Melamine | About 15% to about 25% |

TABLE III

| Thermoset Composite Constituent | Concentrations (% by weight) |
|---|---|
| Engineered Recycled Rubber Particles (EERP) | About 35% to about 45% |
| Polyurea Resin | About 14% to about 16% |
| Granulated Silica | About 7% to about 12% |
| Urea Melamine | About 15% to about 25% |

In any of the embodiments including the above concentrations, and/or concentration ranges, water may be included at a concentration range of about 0.3% to about 2.0% by weight and preferably from about 0.5% to about 1.8% by weight.

All of the composite constituents are weighed before mixing, or introduction to a mold, to accurately input a desired amount of each of the constituents. For example, the EERP, urea melamine and granulated silica are added to a mixer for blending and mixing for a first predetermined time or resident time (e.g. about 60 seconds), which may vary according to the amount of the constituents and the size and speed of the blender/mixer. The polyurea binding agent is added to the blend after the first resident time has elapsed; and, then water, to the extent water is used, is added after a second resident time (e.g. about 3 to 4 minutes) has elapsed. The blend is mixed further for an additional third resident time (e.g. 1 minute) to form the homogenous blend for molding.

Embodiments with Glass Fiber

In an embodiment, the thermoset composite material may comprise a glass fiber material, and preferably in an amount that is from about 5% to about 25% by weight of the glass fiber and preferable from about 15% to about 20% by weight. With respect to embodiments including the glass fiber the other constituents may be included at concentrations as set forth in the below Table IV.

TABLE IV

| Thermoset Composite Constituent | Concentrations (% by weight) |
|---|---|
| Engineered Recycled Rubber Particles (EERP) | About 20% to about 40%; and, preferably about 30% to about 35% |
| Polyurea Resin | About 15% to about 22%; and, preferably from about 18% to about 20% |
| Granulated Silica | About 5% to about 8%; and, preferably about 6% |
| Urea Melamine | About 10% to about 20%; and, preferably about 12% to about 18% |

This formulation may include water including from about 0.3% to about 2.0% by weight of water and preferably from about 0.5% to about 1.8% by weight of water.

The type of glass fiber may be an E-glass type, which is an alumino-borosilicate glass. Such glass fibers may have a silane based coating that is compatible with the polyurea binding agent. The glass fiber may have lengths from about 0.5 inches to about 2.0 inches, with a preferred length of about 0.75 inches. The diameter of the glass fibers may in the range of about 10 microns to about 20 microns, preferably from about 13 microns to about 17 microns. In addition, the glass fiber is preferably in an "unbundled" configuration to better facilitate networking of the fibers in the finished composite material.

In preparation of the composite material, all constituents are weighed individually before mixing or adding to the mold according to relative concentrations or concentration ranges. The solid constituents may be added to the mixer first including the recycled vulcanized rubber particles, the urea melamine, the granulated silica and the glass fibers. The mixer is activated to mix the solid constituents for a first time duration or resident time to form a substantially homogeneous blend. After the first time duration, the liquid polyurea binding agent is added and the mixer continues to mix the composite material blend for a second time duration, after which the water is added. The blend is mixed further for a third time duration.

In an embodiment in which a railroad crosstie is formed, the composite material is placed in a railroad crosstie heated mold and a compressive force is applied. In an embodiment, the compressive force may be anywhere from about 300 psi to about 1000 psi, and preferably about 450 psi. The mold and/or composite material is heated to a temperature of about 240° F. to about 270° F., and preferably to about 255° F. The compressive force and heat are applied to the composite material for a pre-determined time duration of about 15 minutes to about 60 minutes, and preferably about 20 minutes. The foregoing method and composite material may be used to form a railroad crosstie that meets railroad crosstie standards as set by AREMA.

The use of glass fibers may increase the modulus of elasticity of a railroad crosstie by as much as a factor of two or three, and the glass fiber increases resistance to wear and abrasion. The glass fiber also enhances other physical properties such as surface hardness (or face compression), electrical impedance due to insulating nature of glass, and tensile strength.

Embodiments with Encapsulated Glass Mat(s)

In an embodiment, one or more glass mats may be encapsulated in the thermoset composite material when the thermoset composite blend is introduced into a railroad crosstie mold. The glass mat material may be present in an amount of about 5% to about 15% by weight, and preferably about 10% by weight of the glass mat relative to a combined weight of the thermoset composite material and the glass mat. The glass mat may be used in combination with the above-described glass fiber material, which may be present in concentrations ranging from about 3% to about 7% by weight. With respect to embodiments including the glass mat, with or without the glass fiber, the other constituents may be included at concentrations as set forth in the below Table V.

TABLE V

| Thermoset Composite Constituent | Concentrations (% by weight) |
| --- | --- |
| Engineered Recycled Rubber Particles (EERP) | About 20% to about 40%; and, preferably about 30% to about 40% |
| Polyurea Resin | About 15% to about 22%; and, preferably from about 18% to about 20% |
| Granulated Silica | About 5% to about 8%; and, preferably about 6% |
| Urea Melamine | About 10% to about 20%; and, preferably about 12% to about 18% |

This formulation may include water including from about 0.3% to about 2.0% by weight of water and preferably from about 0.5% to about 1.8% by weight of water.

The type of glass mats used may include an E-glass type, which is an alumino-borosilicate glass. Such glass fibers of the mats may have a silane based coating that is compatible with the polyurea binding agent. The diameter of the glass fibers of the mats may be in the range of about 10 microns to about 20 microns, preferably from about 13 microns to about 17 microns, and even more preferably the diameter may be 13 microns. The glass mat thickness may be from about ⅛ inches to ½ inches thick, and have a density from about 0.5 oz/ft³ to about 3.0 oz/ft³. The glass mats may be cut to desired dimensions. Given that a standard railroad crosstie is 7"×9"×8.5' or 9', the glass mats may be cut to widths of about 7.0 inches to about 7.5 inches and to lengths of about 100 inches to about 102 inches. These dimensions of the glass mats are given by way of example only, and embodiments disclosed herein are not intended to be so limited. For example, the glass mats may be cut into smaller sizes and encapsulated and dispersed throughout the composite material as desired to meet certain railroad crosstie standards as adopted by AREMA.

Figure 2:
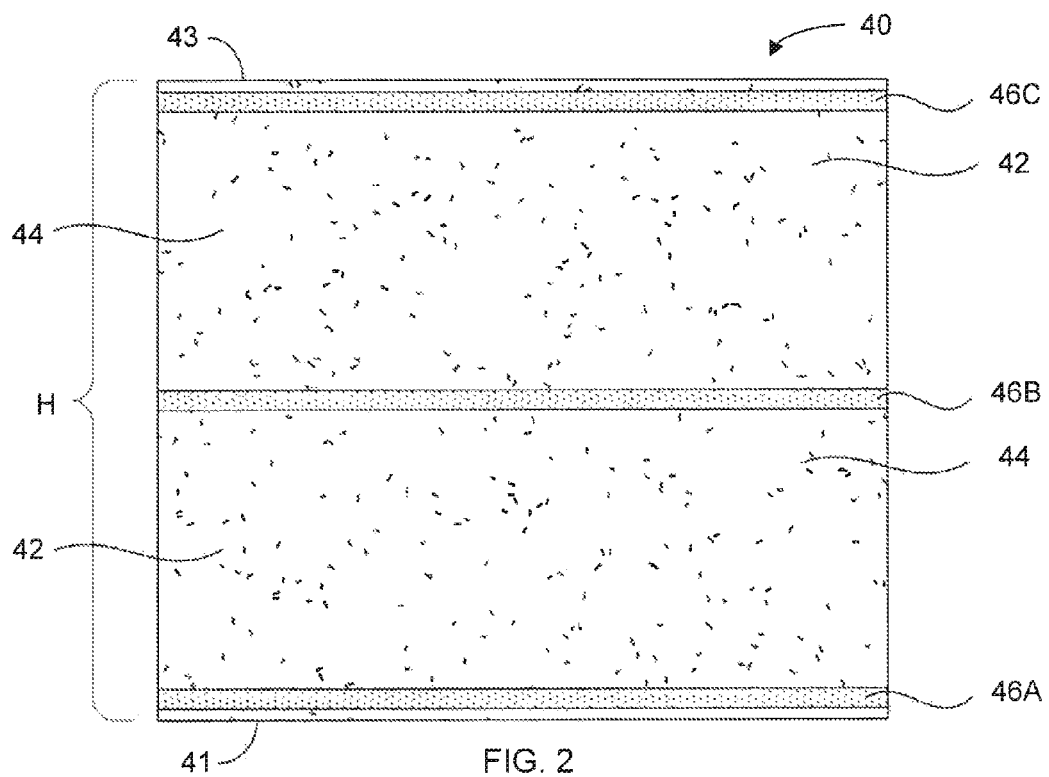
FIG. 2 is a schematic cross-sectional view of a composite railroad crosstie comprising an embodiment of thermoset composite material with encapsulated glass fibers and glass fiber mats.
Figure 3:
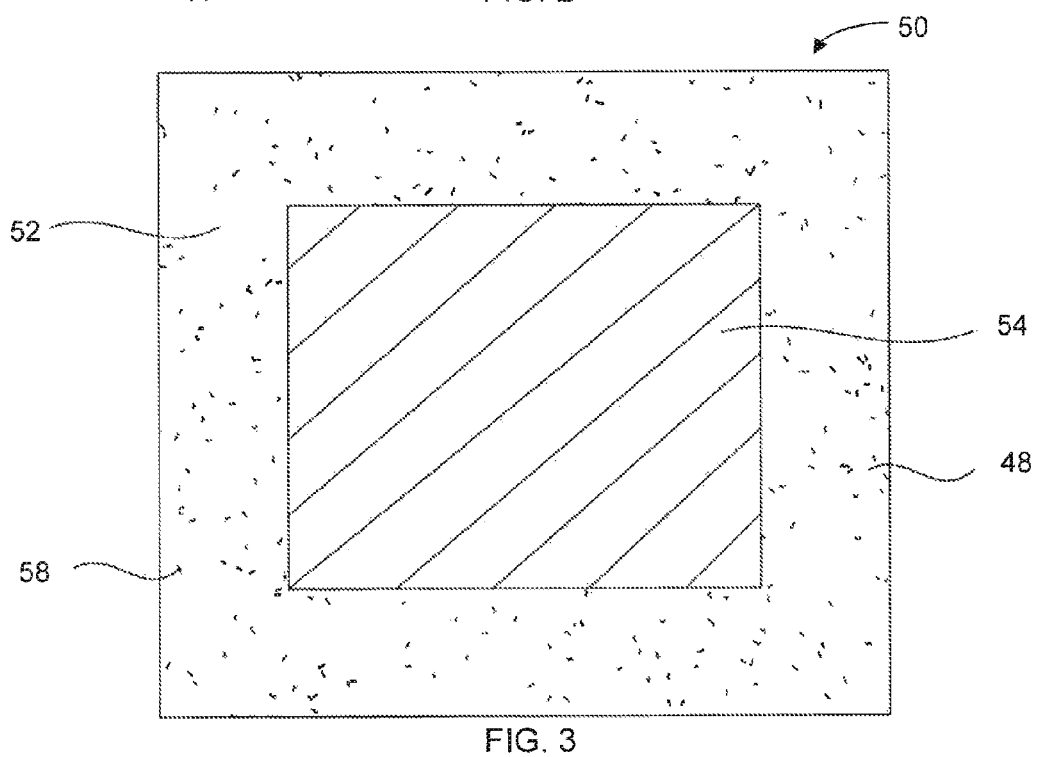
FIG. 3 is a schematic cross-sectional view of a composite railroad crosstie comprising an elongated wooden core insert encapsulated within a thermoset composite material including encapsulated glass fiber material.

A schematic cross-sectional representation of a railroad crosstie including the glass mats is shown in FIG. 2. As illustrated, the railroad crosstie 40 is composed of the above-described thermoset composite material 42 including unbundled glass fiber material 44. For such a composite material, the glass fiber concentration may be from about 5% to about 15% by weight, and preferably 10% by weight of the glass fiber. In addition, the glass mat may be present at a concentration of about 3% to about 7% by weight and preferably 5% by weight. However, embodiments that include glass mat reinforcements may not require a thermoset composite material that includes the above-described glass fiber material. In an embodiment in which glass fiber is included at amounts from about 5% to about 10% by weight, about 240 lbs to about 250 lbs of composite material may be molded to form a crosstie.

Glass mats 46A, 46B and 46C are encapsulated within the composite material 42 and spaced apart at predetermined intervals along a height "H" of the crosstie 40. As further shown, the glass mats 46A, 46B and 46C are disposed parallel to one another and to the top and bottom surfaces 43, 41 of the crosstie 40. The glass mat 46A may about ¼" from the bottom surface 41; and, glass mat 46C may be similarly positioned about ¼" from the top surface 43. Moreover, the glass mats may be positioned within or on the composite material 42 as desired to enhance the properties of the railroad crosstie. For example, one or more glass mats may be spaced lengthwise on the crosstie 40 and spaced at different depths of the crosstie 40 at positions corresponding to positions of track rails on the crosstie, and at the center of the crosstie for reinforcement at the center and rails seat areas (see, FIG. 7) of the crosstie 40.

In the assembly of the composite railroad crosstie according to embodiments disclosed herein, an amount of composite blend having been mixed and blended is placed within a railroad crosstie mold to a desired thickness. Then a glass mat 46A is placed within the mold (not shown) covering at least a portion of the composite material 42. Alternatively, the glass mat 46A may be placed on a bottom of the mold before providing any of the thermoset composite material 42 in the mold over the mat 46A. This technique is repeated for mats 46B and 46C. By way of example, a total of about 240 lbs to about 250 lbs. may be placed in the mold with the glass mats 46A, 46B and 46C.

A compressive force is applied to the composite material 42 and glass mats 46A-46C at a pressure of about 300 psi to about 1000 psi, and preferably about 450 psi. The composite material is heated to a temperature of about 240° F. to about 270° F., and preferably to about 255° F. The compressive force and heat are applied to the composite material for a predetermined time duration of about 15 minutes to about 60 minutes, and preferably about 20 minutes.

These glass mats may be used with a thermoset composite material that includes or does not include the above-described glass fibers. In addition, the glass mats may be used in combination with core inserts as described in more detail below. The use of glass mats concentrates the glass fibers in areas of the railroad crosstie that bear the highest loads during testing and field use. In addition, the concentration of the glass fibers enhances resistance to both tensile and compressive forces.

Embodiments with Core Inserts

Figure 4:
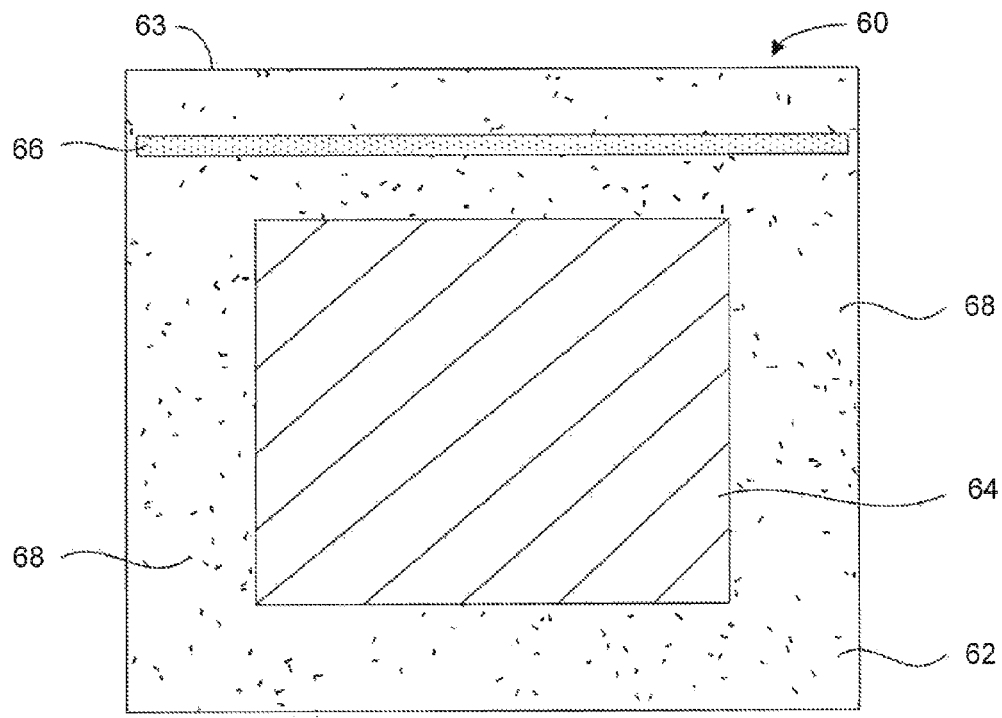
FIG. 4 is a schematic cross-sectional view of a composite railroad crosstie comprising an elongated wooden core insert and a fiber glass mat encapsulated within a thermoset composite material including an unbundled glass fiber material.

With respect to FIGS. 3-6 embodiments of composite railroad crossties 50, 60, 70, 90 are shown in schematic cross-section including core inserts to enhance the structural integrity of a molded and cured thermoset composite material according to embodiments of the invention. The embodiments shown in FIGS. 3 and 4 include wooden inserts 54, 64 encapsulated within a thermoset composite material 52, 62 respectively. The inserts 54, 64 are encapsulated within a thermoset composite material 52, 62 including a glass fiber material 58, 68; however, embodiments of railroad crossties according to the subject invention are not limited to the composite material 52, 62 including glass fiber. The composition, of the thermoset composite material may include any of the previously described compositions, in accordance with embodiments of the invention. In addition, or alternatively, as shown in FIG. 4, a glass mat 66 is shown encapsulated within thermoset composite material 62 and spaced apart from the insert 64 toward a top surface 63 of crosstie 60.

The wooden inserts 54, 64 may be either a recycled wooden railroad crosstie or a "virgin" wooden core insert. The term "virgin" as used herein may encompass a piece of lumber that has been cut according to pre-determined dimensions, but has not otherwise been used for human consumption. In either case, the inserts 54, 64 preferably have dimensions of about 4" to 5"×7" to 8"×96"; however, other dimensions may be used that embody the subject invention. Alternatively, multiple smaller inserts may be used. At least with respect to the virgin insert, known hardwoods such as oak, birch, ash, hickory, etc. may be used to form the insert.

A used or reclaimed railroad crosstie, if recycled effectively, may function as a core insert for composite railroad in accordance with embodiments of the invention. At initial reclamation of railroad crossties, the crossties are preferably graded to identify which reclaimed crossties are acceptable for used as a core insert in general, and possibly further identification is made for different reclaimed crossties for different railroad crosstie functions. The reclaimed crossties may then be cut according to predetermined dimensions associated with a core insert and for use with a composite railroad crosstie. To the extent that the reclaimed crosstie has any defects such as cracks, spike holes, etc. a polyurethane filler by be used to fill the defects and enhance the structural integrity of the reclaimed crosstie core insert.

Sample testing was conducted on composite railroad crossties including the above-described formulations of thermoset composite material comprising ERRP, urea melamine, granulated silica and a water catalyst tested. Each of the composite railroad crossties included an encapsulated elongated core insert comprising a treated hardwood core insert. The testing was performed at Transportation Technology Center, Inc. according to test specifications outlined in Volume 1, Chapter 30, Part 2, of the AREMA's 2012 *Manual for Railway Engineering*. The test results are provided in the below Table VI:

TABLE VI

| AREMA TEST | DATE COMPLETED | TEST VALUES | MINIMUM REQUIREMENT | CURRENT STATUS |
|---|---|---|---|---|
| Electrical Impedance | Mar. 14, 2013 | 486,000 ohms after 6 hours water soak | 10,000 ohms after water soak | Met requirement - Certified |
| Wear/Abrasion | Aug. 16, 2013 | Displacement = 0.1425" at 3 million cycles No cracks evident | Rail head displacement = 0.2" max | Met requirement - Certified |
| Center Negative Bending | Dec. 9, 2013 | Modulus of Elasticity = 203,772 psi Modulus of Rupture = 3.160 psi | MOE = 170,000 psu minimum MOR = 2,000 psi | Met requirement - Certified |
| Rail Seat Compression | May 7, 2013 | 0.216"elastic Deformation 0.043" permanent deformation | 0.250" maximum elastic deformation 0.125" permanent deformation | Met requirement - Certified |
| Spike Withdrawal | Dec. 11, 2013 | 4,005 lbs | 1,9000 lbs | Met requirement - Certified |
| Rail Seat Bending | Dec. 4, 2013 | 21,000 lbs for 3 mins no cracks or breaks | 21,000 lbs for 3 minutes no cracks or breaks | Met requirement - Certified |
| Spike Lateral Restraint | Dec. 12, 2013 | 1,527 lbs average | No current AREMA requirement Recommends holding load at 0.2" Deflection of 12,000 lbs | Acceptable values for spike restraint |

The dimensions of the sample railroad crossties 7"×9"×102" and the core inserts had dimensions of to 4 to 4.5"×7 to 7.5"×96" (±0.5"). As shown, the sample railroad crossties met the test requirements as adopted by AREMA.

Figure 5:
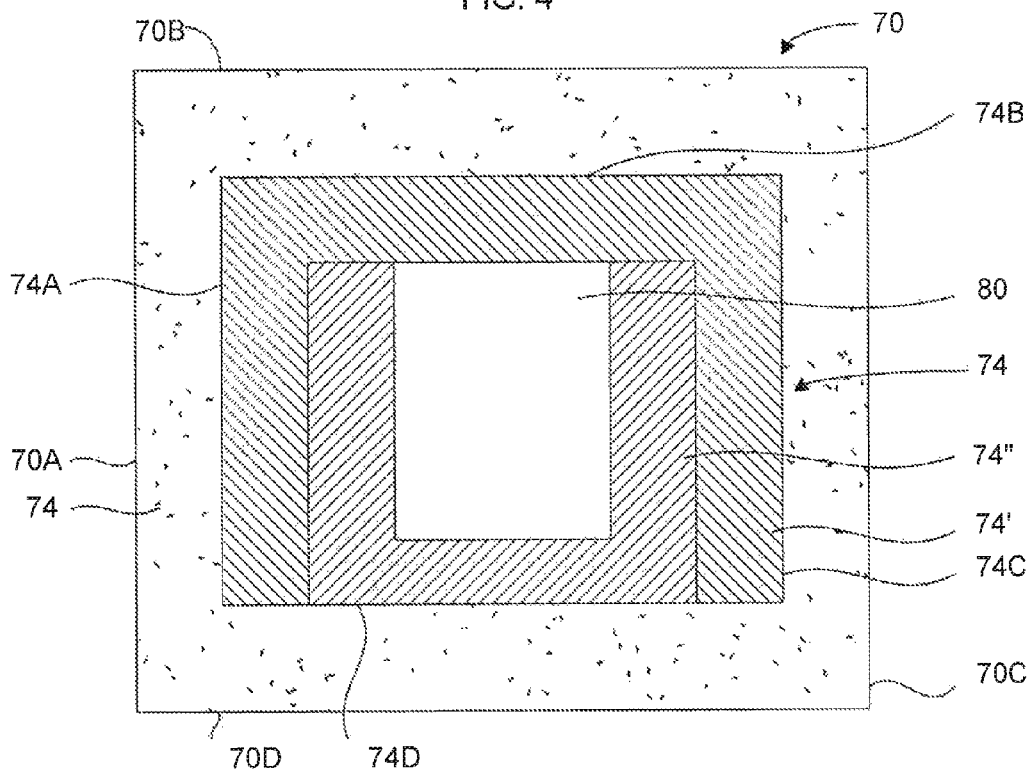
FIG. 5 is a schematic cross-sectional view of a composite railroad crosstie comprising an elongated synthetic composite core insert with a first geometric configuration encapsulated within a thermoset composite material including an unbundled glass fiber material.
Figure 6:
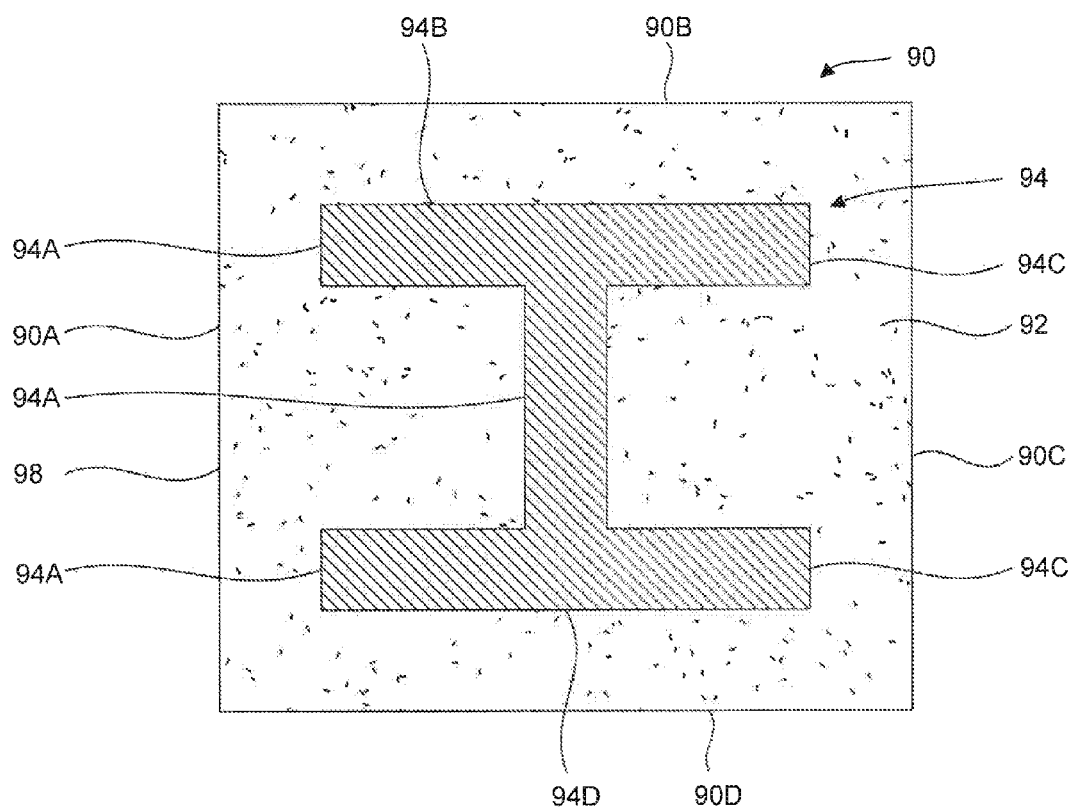
FIG. 6 is a schematic cross-sectional view of a composite railroad crosstie comprising an elongated synthetic composite core insert with a second geometric configuration and encapsulated within a thermoset composite material including an unbundled glass fiber material.

Other types of inserts are shown in FIGS. 5 and 6, and may include a reinforced composite insert, instead of a wooden insert. The embodiment shown in FIG. 5 includes an elongated box-like configuration that may have similar dimensions to that of the above-described wooden inserts. As illustrated, composite railroad crosstie 70 includes an insert 74 which may comprise two generally U-shaped or C-shaped members 74', 74" juxtaposed relative to one another to form the elongated box-like configuration, with an internal volume 80. As shown the insert 74 is encapsulated in a thermoset composite material 72. Accordingly, the insert 74 has four surfaces 74A, 74B, 74C and 74D each being parallel to a corresponding outside surfaces 70A, 70B, 70C and 70D of the crosstie 70. The internal volume 80 may be empty or it may be filled with the thermoset composite material. The thermoset composite material 72 shown in FIG. 5 includes the above described glass fiber material 78.

With respect to FIG. 6, a composite railroad crosstie 90 is shown with a reinforced composite insert 94 having a cross-sectional I-beam configuration, including at least four surfaces 94A, 94B, 94C and 94D that are parallel to outer surfaces 90A, 90B, 90C, 90D of the crosstie 90. In either embodiment shown FIGS. 5 and 6, the inserts 74, 94 may comprise a thermoplastic resin reinforced with a glass fiber material wherein the inserts 72, 92 may include up to about 30% by weight of glass fiber, or preferably from about 15% to about 30% by weight of the glass fibers. The glass fibers may be the above described unbundled glass fibers encapsulated within a polypropylene or polyvinyl chloride.

In any embodiments including a core insert, the thermoset composite material may include the above-described glass fiber material with one or glass mats encapsulated within the composite material, or only the glass fiber material without the addition of glass mats. For those embodiments in which a glass fiber material is incorporated in the thermoset composite material, the glass fiber material may be provided at concentrations ranging from about 5% to about 15% by weight. Alternatively, the thermoset composite material may not include the glass fiber material, but may have one or more glass mats encapsulated within the thermoset composite material with an insert.

Again in reference to FIG. 4, a composite railroad crosstie 60 is shown including a wooden core insert 64 encapsulated within thermoset composite material 62 including the above-described glass fibers 68. In addition, at least one glass mat 66 is shown encapsulated with the thermoset composite material 62 and spaced apart from the insert 64 toward a top surface 63 of the railroad crosstie 60. While this embodiment is shown with a single glass mat 66, the crosstie 60 may include multiple glass mats spaced apart from the insert 64 toward the top surface 63 and spaced apart from one another. The top surface 63 of the railroad crosstie 60 refers to the surface of the crosstie 60 facing and/or supporting railroad track rails. In such embodiments, the railroad crosstie 60 may include about 160 lbs. to about 170 lbs of thermoset composite material. The thermoset composite material in embodiments including an insert and glass mat may, or may not, include the glass fiber material, as the insert 64 and glass may 66 alone may sufficiently reinforce crosstie 60 to meet AREMA standards.

The processing parameters associated with any of the above-described embodiments including an insert are similar to the parameters associated with embodiments that do not include a core insert. That is a compressive force is applied to the thermoset composite material at pressures ranging from about 300 psi to about 1000 psi., and preferably at 450 psi. The pressure is applied at temperatures ranging from about 230° F. to about 270° F., and for a time duration ranging from about 15 minutes to about 60 minutes, and preferably for at least 20 minutes.

Figure 7:
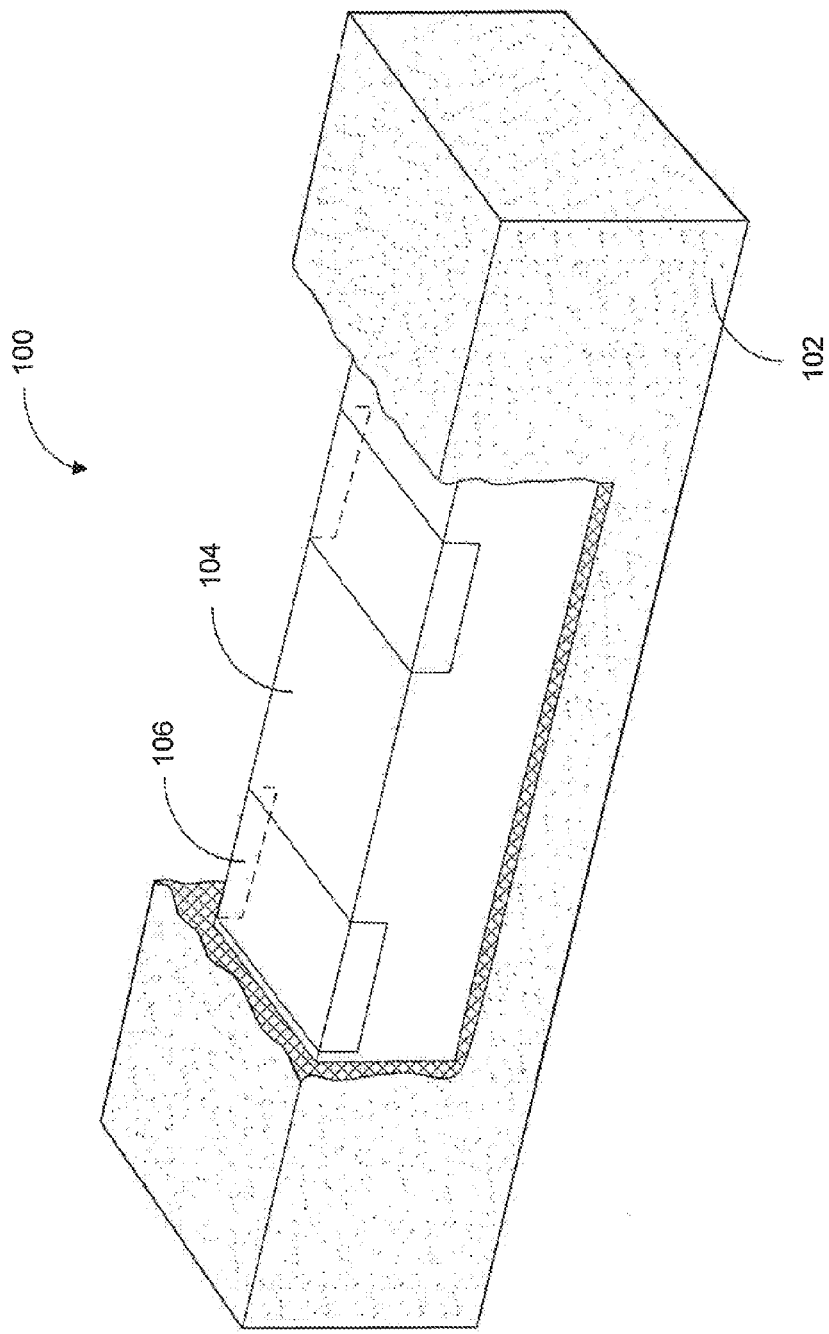
FIG. 7 is a partial sectional view of a composite railroad crosscrosstie comprising an elongated core insert and rail seat reinforcements encapsulated within a thermoset composite material.

With respect to FIG. 7, a partial sectional view of a composite railroad crosstie 100 is schematically shown including a core insert 104 encapsulated within a thermoset composite material, which may include any of the above-described formulations. The insert may be a reclaimed and recycled crosstie or a virgin wooden crosstie. One or more rail seat reinforcement members 106 are encapsulated in the thermoset composite material 102 on top of the insert 104 at locations where crosstie 100 will support railroad track rails. The placement of such members 106 at the rails support locations enhances the crosstie's 100 resistance compressive tensile forces. The members 106 may be composed of up to about 30% by weight of glass fiber, or preferably from about 15% to about 30% by weight of the glass fibers encapsulated in a thermoplastic resin, such as polypropylene or polyvinyl chloride.

As mentioned above, a structural component that may be fabricated from the above-described thermoset composite material is a railroad crosstie. The railroad crosstie should be manufactured according to the preferred American Railway Engineering and Maintenance-of-Way Association (AREMA) standards. Accordingly, a typical railroad crosstie manufactured according to AREMA standards is 7"×9"×102" (or 108"). Furthermore, a thermoset composite material fabricated as described above having a Durometer Shore A of at least 80, a tensile strength of at least 250 psi and a density of about 60 lbs/ft$^3$ may meet AREMA standards for railroad crossties.

Figure 8:
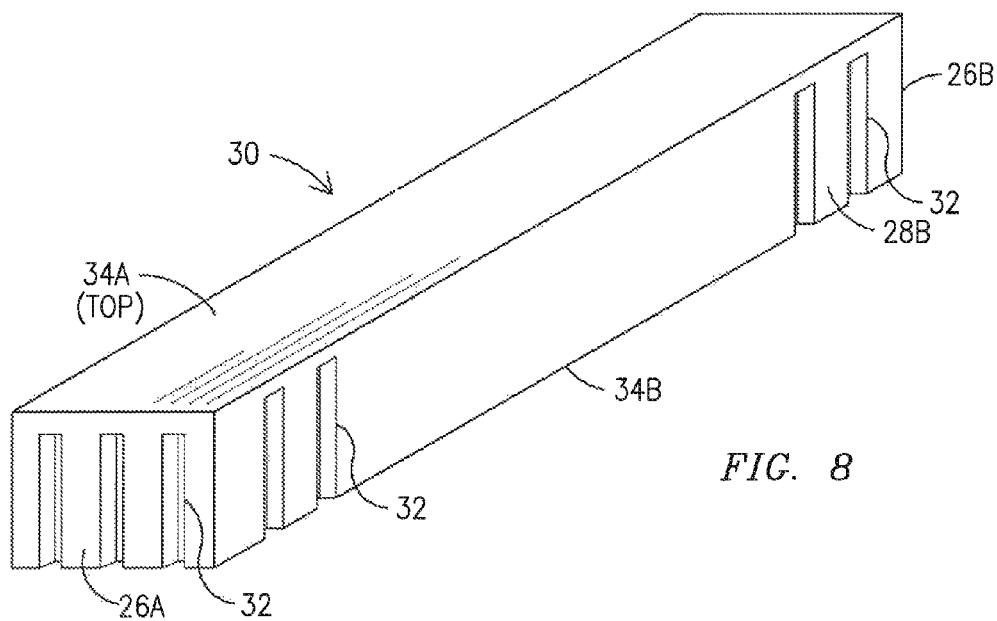
FIG. 8 is a top perspective view of a railroad crosstie comprising the thermoset composite material.
Figure 9:
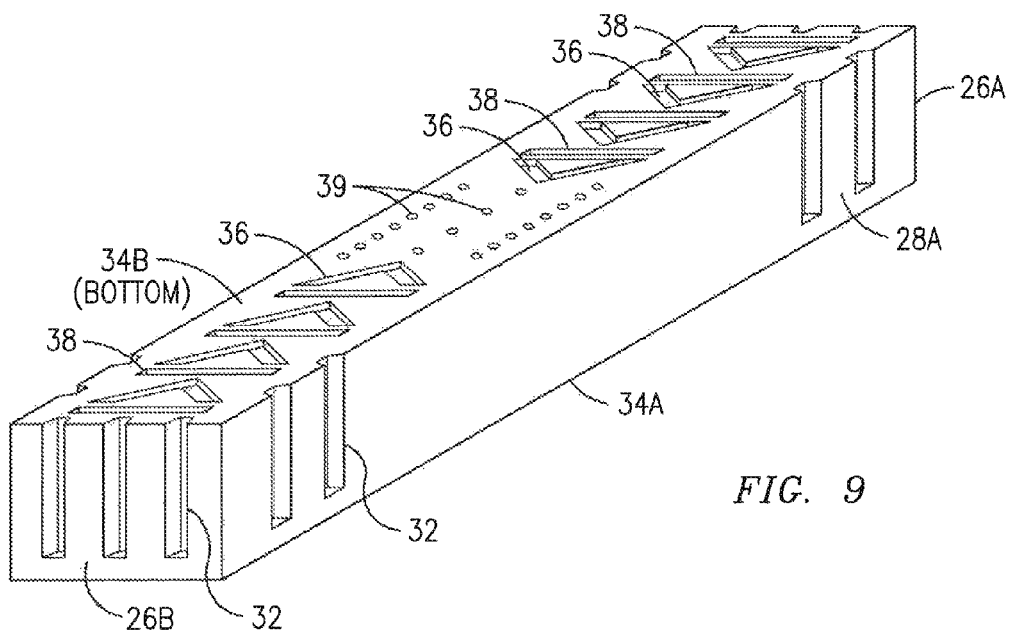
FIG. 9 is a bottom perspective view of the railroad crosscrosstie FIG. 2.

In an embodiment as shown in FIGS. 8 and 9 a railroad crosstie 30 configuration has the two vertical sides 28A and 28B, a top side 34A, a bottom side 34B, and opposing ends 26A and 26B. Both vertical sides 28A and 28B and each end 26A and 26B will be provided with substantially straight vertical grooves 32 at a minimum depth of 3/16". As measured vertically from the railroad crosstie bottom side, grooves on both vertical sides and both ends will terminate at a point so as to provide at least 1" of thickness of full 9'×(102 or 108)" surface area. This configuration allows for vertical ejection of the crosstie front the compression mold.

In addition, grooves may be provided on the bottom side of the railroad crosstie configuration. Because of the molding technique (compression molding) used, the groove configuration on the bottom side may consist of a series chevrons 36, grooves 38 and/or dimples 39; however, the types of depressions, grooves or indentations on any side of the component may be as simple or complex depending on the molding techniques used. The molded grooves 32, 38, chevrons 36 and dimples 39 provide a structural interlock with the railroad crosstie and road-bed crushed stone support ballast to thereby prevent longitudinal movement of a railroad crosstie and rail assembly. Alternate interlocking sidewall configurations are possible, such as tire tread patterns, using hydraulically or pneumatically driven mold side-wall movement.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A composite railroad crosstie, comprising:
a thermoset composite material comprising a blend of vulcanized recycled rubber particles, a polyurea binding agent, and a urea melamine filler in powder form; and,
wherein the blend comprises about 30% to about 50% by weight of the vulcanized recycled rubber particles, and the blend is subjected to a compressive molding force and heat for a resident time period forming the composite railroad crosstie.

2. The railroad crosstie of claim 1 wherein the thermoset composite material further comprises a granulated silica material.

3. The railroad crosstie of claim 1 wherein the urea melamine is a powdered recycled urea melamine.

4. The railroad crosstie of claim 2 wherein the thermoset composite material comprises:
about 15% to about 25% by weight of the urea melamine;
about 5% to about 15% by weight of the granulated silica material; and,
about 12% to about 20% by weight of the polyurea binding agent.

5. The railroad crosstie of claim 4 wherein the thermoset composite material further comprises about 0.3% to about 2.0% by weight of the water.

6. The railroad crosstie of claim 1 wherein the thermoset composite material further comprises a fibrous glass material.

7. The railroad crosstie of claim 6 wherein the thermoset composite material comprises about 10% to about 25% by weight of the fibrous glass material.

8. A composite railroad crosstie, comprising:
about 30% to about 50% by weight of vulcanized recycled rubber particles;
about 12% to about 20% by weight of a polyurea binding agent added to the vulcanized rubber particles;
about 5% to about 15% by weight of a granulated silica material;
about 15% to about 20% by weight of urea melamine powder filler and,
wherein the vulcanized recycled rubber, the polyurea binding agent, the granulated silica and urea melamine, is subjected to a compression molding force of about 300 psi to about 1,000 psi and heat at one or temperatures of about 230° F. to about 270° F. for a resident time period forming the thermoset composite railroad crosstie.

9. The railroad crosstie of claim 8 wherein the thermoset composite material comprises about 10% by wt to about 25% by wt of a fibrous glass material.

10. A method of assembling a railroad crosstie, comprising:
developing a thermoset composite material by mixing of blend of vulcanized recycled rubber particles, a polyurea binding agent, a granulated silica material and a urea melamine filler in powder form;
introducing the blend into a compression mold;
subjecting the blend to a compressive molding force and heat for a resident time;
allowing the blend to cool and harden after the resident time has elapsed; and,
removing the hardened blend from the mold.

11. The method of claim 10 wherein the blend further comprises a fibrous glass material.

12. The method of claim 10 wherein the blend further comprises an unbundled glass fiber material.

* * * * *